United States Patent
Britsch

(10) Patent No.: US 7,593,750 B2
(45) Date of Patent: Sep. 22, 2009

(54) METHOD AND SYSTEM FOR OPERATING A RADIO COMMUNICATION NETWORK

(75) Inventor: Matthias Britsch, Königswinter (DE)

(73) Assignee: T-Mobile Deutschland GmbH, Bonn (DE)

( * ) Notice: Subject to any disclaimer, the term of this patent is extended or adjusted under 35 U.S.C. 154(b) by 300 days.

(21) Appl. No.: 10/557,396

(22) PCT Filed: May 19, 2004

(86) PCT No.: PCT/EP2004/005421

§ 371 (c)(1),
(2), (4) Date: Jul. 24, 2006

(87) PCT Pub. No.: WO2004/105321

PCT Pub. Date: Dec. 2, 2004

(65) Prior Publication Data

US 2007/0066302 A1    Mar. 22, 2007

(30) Foreign Application Priority Data

May 20, 2003    (EP)    .................... 03011408

(51) Int. Cl.
*H04M 1/00* (2006.01)
(52) U.S. Cl. .............. 455/552.1; 455/426.1; 455/426.2; 455/414.1; 455/456.3; 370/353
(58) Field of Classification Search .............. 455/426.2, 455/426.1, 456.3, 552.1; 370/353
See application file for complete search history.

(56) References Cited

U.S. PATENT DOCUMENTS

| | | | | |
|---|---|---|---|---|
| 6,230,005 | B1 * | 5/2001 | Le et al. | 455/414.1 |
| 6,230,009 | B1 * | 5/2001 | Holmes et al. | 455/426.1 |
| 6,671,507 | B1 * | 12/2003 | Vinck | 455/411 |
| 6,687,243 | B1 * | 2/2004 | Sayers et al. | 370/356 |
| 6,961,578 | B2 * | 11/2005 | Silver et al. | 455/456.3 |
| 6,990,347 | B2 * | 1/2006 | McCann | 455/445 |
| 2002/0068565 | A1 | 6/2002 | Purnadi et al. | |
| 2004/0166843 | A1 | 8/2004 | Hahn | |
| 2006/0084431 | A1 * | 4/2006 | Hua et al. | 455/433 |
| 2006/0154668 | A1 * | 7/2006 | Li et al. | 455/449 |

FOREIGN PATENT DOCUMENTS

| | | |
|---|---|---|
| CA | 2 464 622 | 5/2003 |
| WO | WO 01/99466 A2 | 12/2001 |
| WO | WO0199466 A2 | 12/2001 |
| WO | WO0247404 A2 | 6/2002 |
| WO | WO02087160 A2 | 10/2002 |
| WO | WO03036904 A1 | 5/2003 |
| WO | WO 2004/066707 A2 | 8/2004 |
| WO | WO2004066707 A2 | 8/2004 |

\* cited by examiner

*Primary Examiner*—Lester Kincaid
*Assistant Examiner*—Isaak R Jama
(74) *Attorney, Agent, or Firm*—The Maxham Firm

(57) ABSTRACT

A method and a system for operating a radio communication network which is characterized in that a first radio communication network uses at least one function of a second radio communication network by connecting the first radio communication network to at least one module of the second radio communication network.

16 Claims, 1 Drawing Sheet

METHOD AND SYSTEM FOR OPERATING A RADIO COMMUNICATION NETWORK

Figure 1:
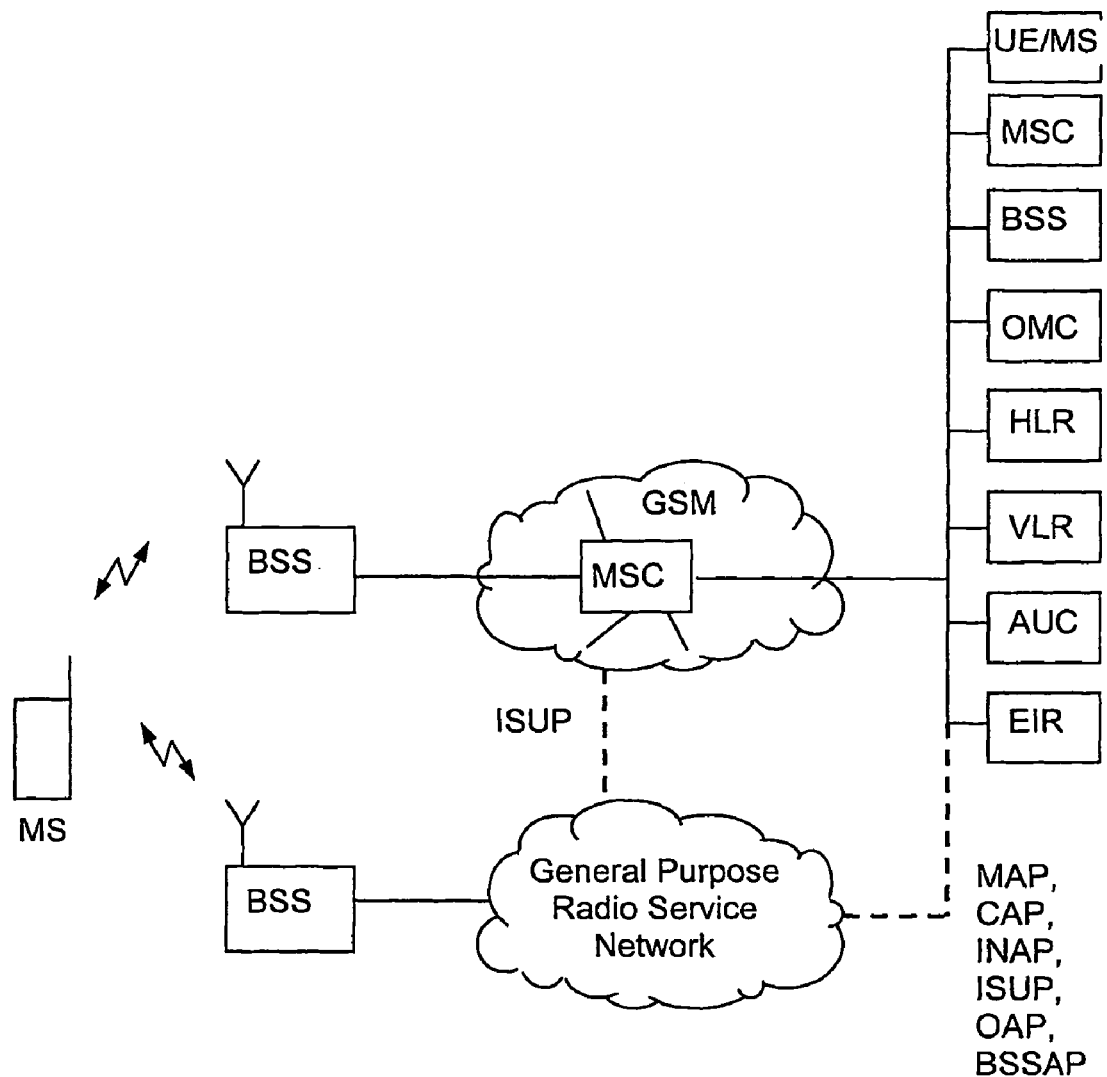

The invention relates to a method and system for operating a radio communication network according to the preamble of the independent claims.

It is the objective of the present invention to provide a method and a system for operating a radio communication network with a reduced requirement of network infrastructure.

This objective is achieved by providing method and a system as described in the independent claims. Other features which are considered to be characteristic for the invention are set forth in the appended claims.

The inventive idea is in building a general purpose radio service network as an overlay network to a running GSM network by making use of GSM network features, such as authentication, mobility management and signalling channels. Thus using the GSM network as implementation platform for another separated radio network, which is using different radio channels. This radio network can be of any type, including also cellular and satellite networks.

The end device of the general purpose radio service network is co-located to a GSM radio device in the same hardware shelf, such that the GSM functionality's are available for the GSM part of the combined device and the general purpose radio service functionality's for the general purpose radio part. On the network side the GSM authentication, location information and mobility management functionality can be applied for mobility management, authentication and signalling to the general purpose radio network device, due to the fact that it is bundled to the GSM device and therefore e. g. the same location information is valid, the same user is accessing the device, etc. In a more tightly integrated version particular features of the GSM network could be used for both parts of the combined end device. This would for example allow activation of the general purpose radio service device via GSM signalling channels.

DETAILED DESCRIPTION

This invention can be used for all radio communication networks which utilities at least one function of a second digital radio communications network. One example of an implementation using a GSM network is described.

FIG. 1 shows a schematic system architecture of a General Purpose Radio Services Network as an overlay network to a GSM radio network.

The general purpose radio service network can be implemented in two different ways. First using a radio frequency band totally different from the GSM frequency and secondly using parts of the GSM frequency range. The coding scheme of the general purpose radio service can be any available, including GSM. Anyhow which coding scheme and which frequency band is used, the traffic is not transmitted via the GSM air interface.

The general purpose radio module is integrated into a GSM device which is sending and receiving the complete range of GSM signalling information. Please note that special applications may require parallel transceiving of GSM and general purpose radio service information, both signalling and payload. The use of GSM payload channels is not required at all for functionality of the general purpose radio network. This allows the general purpose radio service network devices to use only an IMSI for identification. However it may be required to have the full functionality of a GSM device enabled in the combined device, to enable special features which allow for certain services offerings, e. g. over the air activation or the general purpose radio service network application.

All general purpose radio service network module functions and the GSM network modules radio parts on the combined device are logically separated. However the GSM radio module may pipe through signalling information for the general purpose radio module. The transmission of information using signalling channels transmission capacity is the only direct exchange of information between both modules in the combined client. Both may be implemented using the same hardware resources, such as radio transceiver chips, processors, etc.

Prerequisite for using the general purpose radio service network is that the terminal is attached to the GSM network and the active state of the terminal is kept in the network to guarantee the availability of location and mobility management information required for operation of the general purpose radio service network. Thus it is also assured that a GSM signalling connection is available to send signalling information to the general purpose radio module, using GSM signalling capacity. Therefore the general purpose radio module is able to receive in-band signalling from the general purpose radio service network via it's air interface and out-band signalling via the GSM air interface. Both connections are using distinct frequency bands and/or coding schemes. The out-band signalling scenario may especially be applicable if the general purpose radio module is not attached to the general purpose radio service network and any action shall be triggered, according to the required features and behaviour of the general purpose radio service network application.

All payload generated by the general purpose radio service network is not to be transmitted via the GSM air interface and the GSM core network, rather through the general purpose radio service network interface.

Thus the traffic from the general purpose radio service network is completely invisible for the GSM network and the networks are separated. On the network side information is exchanged only via interfaces to the GSM network. These interfaces are providing genuine GSM information for use by the general purpose radio service network. No information about the general purpose radio service network is gathered or kept in the GSM network on behalf of the general purpose radio service network. Vice versa the general purpose radio service network may also provide it's information to the GSM network as required but is not actively gathering or keeping information.

The general purpose radio service network is using the mobility management information of the GSM network for it's own mobility management. The information used can be any combination GSM location and mobility information data elements, such as cell-ID, LAC, VLR-ID, etc. This information can be polled by the general purpose radio service network via suited MAP, CAP, ISUP, OAP or INAP requests, such as Any-Time-Interrogation, Location-Area-Update, etc or any proprietary command accessing the GSM network information databases. This includes also the base station subsystem application part (BSSAP) and its protocols BSS-MAP and direct transfer application part (DTAP). The Databases to be addressed are e.g. MSC/VLR, BSC, and HLR, but can also be any implementation specific database, which may also include non-standardised data elements.

The information can also be actively send by the GSM network. Enabling the GSM network nodes to send appropriate location and mobility management information to the general purpose radio service network requires implementation of appropriate trigger mechanisms. This could be for example a function in the BSC triggering the sending of MSISDN, IMSI or any proprietary ID together with previous and current cell ID as an information message via the CCS7 or any other network interface to the general purpose radio service network whenever a general purpose radio service device roams across cell boundaries. The same mechanism could be implemented using MSC/VKLR ID's. In more sophisticated applications these functions could comprise as well filter lists to filter out information related to subsets of clients with particular attributes.

Please note that the use of GSM network location and mobility information by the general purpose radio service network does not require co-located radio base station sites. However an existing base station subsystem infrastructure would ease installation of general purpose radio services radio equipment enormously from an deployment, installation and roll-out point of view.

The general purpose radio service network nodes and application servers may be implemented by making use of hardware resources in the GSM network, such as base transceiver stations, base station controllers, mobile switching centers, etc. This means that these or other GSM modules are hosting the general purpose radio service network logic's together with their genuine GSM functionality's on the same hardware. This can also include the re-use of existing GSM air interface capacity if the according combination of coding schemes and frequency ranges are used.

As the functions are separated, there is no need for co-located general purpose radio service network radio transceiver stations and GSM base transceiver stations. Nevertheless for reasons of network management, mobility management and ease of operation, it may be beneficial to design the cells of the general purpose radio service network in accordance with the GSM RAN. This could include common radio cell boundaries or even logical structures of higher levels, such as BSC or MSC/VLR areas, especially if the general purpose radio service network is of cellular type. For non-cellular general purpose radio service networks any installation method appropriate to the geographical coverage of the related GSM network may be used.

LIST OF ABBREVIATIONS

GSM Global Standard for Mobile Communication
IMSI International Mobile Station Identity
Cell-ID Cell Identity
LAC Local Area Code
VLR-ID Visitor Location Register Identity
MAP Mobile Application Part
CAP CAMEL Application Part
CAMEL Customer Application Mobile Enhanced Logics
ISUP ISDN user part
ISDN Integrated Services Digital Network
OAP Operation and Administration Application Part
INAP Intelligent Network Application Part
MSC Mobile Switching Center
VLR Visitor Location Register
MSC/VLR Mobile Switching Center/Visitor Location Register
MSC/VKLR Mobile Switching Center/Visitor Location Register
BSC Base Station Controller
HLR Home Location Register
MSISDN Mobile Station Integrated Services Digital Network
ID Identity
CCS7 Common Channel Signalling System Number 7
RAN Radio Access Network
AUC Authentication Center
EIR Equipment Identity Register
OMS Operation and Maintenance Center
BTS Base Transceiver Station
BSS Base Station Subsystem (BTS+BSC)

The invention claimed is:

1. A method for operating a general purpose radio service network, comprising the steps of:
   (a) operating the general purpose radio service network as an overlay network to a GSM radio network by using authentication, mobility management, and signaling channels features of the GSM radio network;
   (b) selectively exchanging signaling information via standardized interfaces between both networks;
   (c) selectively accessing network information databases of the GSM radio network;
   (d) generating payload traffic by the general purpose radio service network through an interface of the general purpose radio service network;
   (e) keeping a terminal of the GSM radio network in an active state during use of the general purpose radio service network to assure the availability of signaling information required for operation of the general purpose radio service network to assure that a GSM signaling connection is available for sending signaling information to the general purpose radio network by using the signaling capacity of the GSM radio network;
   (f) receiving in-band signaling information for the general purpose radio service network via an air interface of the general purpose radio service network; and
   (g) receiving out-of-band signaling information for the general purpose radio service network via an air interface of the GSM radio network.

2. The method according to claim 1, wherein the exchanged information can be any combination of location and mobility information data elements.

3. The method according to claim 2, wherein the information data elements comprise, selectively, cell-ID, LAC, and VLR-ID.

4. The method according to claim 1, wherein both radio networks use different radio channels.

5. The method according to claim 1, wherein both radio networks use at least one common radio channel.

6. The method according to claim 1, wherein an end device (mobile station) of the general purpose radio service network is located in proximity to an end device of the GSM radio network, such that the functionalities of both networks are available in a combined end device.

7. The method according to claim 6, wherein selected features of the GSM radio network are used for both networks by the combined end device.

8. The method according to claim 6, wherein during use of the general purpose radio service network the end device of the GSM radio network is kept in an active state to assure the availability of location and mobility management information required for operation of the general purpose radio service network.

9. The method according to claim 1, wherein the GSM radio network databases accessed during step (c) by the general propose radio service network include one or more of MSC, VLR, BSC, HLR, and AUC.

10. The method according to claim 1, wherein information is actively sent from the GSM radio network to the general purpose radio service network by using appropriate trigger mechanisms.

11. The method according to claim 1, wherein the in-band signaling and the out-of-band signaling use distinct frequency bands and/or coding schemes.

12. The method according to claim 1, further comprising the steps of:

triggering sending of mobility management information from the GSM radio network to the general purpose radio service network whenever a device of the general purpose radio service network roams across cell boundaries.

13. A system for operating a general purpose radio service network as an overlay network to a GSM radio network by using authentication, mobility management, and signaling channels features of the GSM radio network, the system comprising;

a GSM radio network, wherein the general purpose radio service network is connected to at least one module of the GSM radio network, wherein nodes and application servers of the general purpose radio service network are implemented by hardware modules of the GSM type radio network, which hardware modules include base transceiver stations, base station controllers, and mobile switching centers; and wherein these or other GSM modules host the general purpose radio service network logics together with their genuine GSM functionalities on the same hardware;

standardized interfaces for selectively exchanging information between both networks;

means for accessing the network information databases of the GSM radio; and means for generating all payload traffic by the general purpose radio service network through only an interface of the general purpose radio service network so that all of the payload traffic from the general purpose radio service network is completely invisible for the GSM radio network and separate from payload traffic from the GSM radio network;

wherein the general purpose radio service network is selectively connected to authentication, mobility, management, and signaling modules of the GSM radio network.

14. The system according to claim 13, wherein the general purpose radio service network is selectively connected to the BTS and the BSC modules of the radio subsystem of the GSM radio network.

15. The system according to claim 13, wherein the general purpose radio service network is selectively connected to the MSC, the HLR, and the VLR modules of the network subsystem of the GSM radio network.

16. The system according to claim 13, wherein the general purpose radio service network is selectively connected to the AUC, the EIR, and OMC modules of the operation and maintenance subsystem of the GSM radio network.

* * * * *

UNITED STATES PATENT AND TRADEMARK OFFICE
CERTIFICATE OF CORRECTION

PATENT NO.        : 7,593,750 B2
APPLICATION NO. : 10/557396
DATED             : September 22, 2009
INVENTOR(S)       : Matthias Britsch Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Twenty-eighth Day of September, 2010

David J. Kappos
*Director of the United States Patent and Trademark Office*